March 2, 1965  M. J. BERLYN  3,171,425
ROTARY VALVE FOR INTERNAL COMBUSTION ENGINES
Filed March 14, 1962  6 Sheets-Sheet 1

INVENTOR.
MARTIN J. BERLYN
BY
ATTORNEY.

March 2, 1965  M. J. BERLYN  3,171,425
ROTARY VALVE FOR INTERNAL COMBUSTION ENGINES
Filed March 14, 1962  6 Sheets-Sheet 2

INVENTOR.
MARTIN J. BERLYN
BY
Raymond A. Paquin
ATTORNEY.

INVENTOR.
MARTIN J. BERLYN
BY
ATTORNEY.

March 2, 1965   M. J. BERLYN   3,171,425
ROTARY VALVE FOR INTERNAL COMBUSTION ENGINES
Filed March 14, 1962   6 Sheets-Sheet 5

INVENTOR.
MARTIN J. BERLYN
BY
ATTORNEY.

March 2, 1965   M. J. BERLYN   3,171,425
ROTARY VALVE FOR INTERNAL COMBUSTION ENGINES
Filed March 14, 1962   6 Sheets-Sheet 6

INVENTOR.
MARTIN J. BERLYN
BY
Raymond A. Paquin
ATTORNEY.

United States Patent Office 3,171,425
Patented Mar. 2, 1965

3,171,425
ROTARY VALVE FOR INTERNAL COMBUSTION ENGINES
Martin J. Berlyn, 389 Metcalfe Ave., Montreal, Quebec, Canada
Filed Mar. 14, 1962, Ser. No. 179,678
11 Claims. (Cl. 137—246.22)

This invention relates to rotary valve devices for the intake and exhaust of four-stroke cycle internal combustion engines.

History of the four-stroke cycle internal combustion engine discloses sustained efforts, extending over more than 50 years, to provide a satisfactory rotary valve for such engines. Some have been marketed, but none successfully.

A few rotary-valved four-stroke cycle engines have demonstrated ability to out-perform conventional engines; but these demonstrations have been in the laboratory or in racing or some other environment in which the engine had benefit of preparation and handling by persons of exceptional technical acumen and mechanical skill. None of these engines ever graduated to commercial acceptance. This is to say that nobody has yet evolved a rotary-valved four-stroke cycle engine suitable for sale to the public.

For commercial acceptability, rotary valves must be competitive with conventional valves, not only in first cost, but also with respect to dependability and ease of maintenance.

Valve devices, rotary or other, for four-stroke cycle engines must seal effectively when closed and must provide free flow paths when open; they must be capable, without detriment to their condition or to their functioning, of accommodating normal dimensional changes due to thermal effects and wear; their lubrication must be accomplished without excessive oil consumption and without causing smoke in the exhaust; they must be adequately cooled to protect them from thermal deterioration at rated engine load or damage at overload; they must not require minute exactness of adjustment for satisfactory performance; they must not call for extraordinary finesse of dimensioning, nor for the employment of exotic materials; they must not demand excessive power for their actuation; they must be capable of long service without adjustment, repair, or renewal; they must operate quietly at all speeds; and they should be of compact configuration, particularly with respect to overall height in the case of vertical engines. Rotary valves which have demonstrated high performance when supervised by experts, but which have not been developed into commercial success, have all failed because they omitted to fulfill one or more of these basic design requirements.

Generally, rotary valves up to this time have been of rigid conical or cylindrical construction fitting very closely in a conjugate stationary housing, and they have depended upon the closeness of the fit to seal differential gas pressure. Close fitting of rigid parts subject to asymmetric heating is incompatible with maintenance of an oil film, especially under conditions of variable heat transfer; it is also incompatible with maintenance of an effective pressure seal.

Whereas the lubrication of a journal bearing is relatively simple because a copious supply of oil may be delivered under high pressure and the excess returned to its source without difficulty, engine valves must not release lubricating oil into the combustion chamber, and seals to prevent this are subject to combustion chamber gas pressures. Some rotary valves of the past have performed well when the supply of lubricating oil was adjusted precisely to suit a given engine load but, with increased engine output, the valve "dried up" and seized; with decreased output, the exhaust smoked and the sparkplugs became subject to fouling.

Another common shortcoming of rotary valves for four-stroke cycle engines up to this time has been that they were not pressure-balanced; this is to say that substantial areas of the valve were exposed to cylinder pressure in such a way as to impart heavy forces on the valve bearings and, unless the bearings were adjusted with exquisite precision, the valve was pressed heavily against its conjugate stationary surface, usually with destructive effect.

I have invented a rotary valve device in which the problems of sealing, lubrication, cooling, pressure balancing, accommodation of dimensional change, and compact configuration have been solved without radical departure from known satisfactory design practises.

The following description, for clarity, is referred to a single-cylinder execution of my invention, but it will be apparent to one versed in the art that the device is equally applicable to multi-cylinder engines for which, in fact, it is more particularly intended.

In its elementary form the basic rotary valve employed in this invention is the oldest of all rotary valve concepts; it is simply a cylindrical plug cock. Many versions of the plug cock have been proposed and tried out as engine valves, but all have failed because their inventors omitted to satisfy one or more of the essential requirements mentioned above.

The rotary valve according to this invention consists essentially of a hollow cylinder provided with a symmetrical diametral tubular valving duct of relatively small, and preferably rectangular, cross section. The valve is cooled by a copious internal flow of lubricating oil which enters axially at one end and leaves axially at the other end. The outside diameter of the valve is a clearance fit in the bore of the valve housing, being in the order of 0.15% smaller than the housing bore diameter. The valve is rotated at one quarter the speed of the engine crankshaft and is also reciprocated through an axial amplitude in the order of 5% of its diameter. The axis of rotation of the valve is parallel with the axis of rotation of the engine crankshaft.

The valve is sealed against axial gas leakage by four circumferential seals symmetrically disposed about the valving duct. These seals are a free fit in grooves formed in the periphery of the valve in planes normal to its axis of rotation. Two inner seals, close to the axial extremities of, but not intersecting, the apertures of the valving duct are of discontinuous four-element construction, each arcuate element being substantially a quadrant. Two outer seals, which are more remote from the apertures of the valving duct, are one-piece gapped spring rings similar to conventional piston rings. The two outer circumferential seals are spaced apart axially by twice the axial spacing of the two inner circumferential seals.

The valve is sealed against tangential gas leakage by four straight axial sealing strips which are a free fit in grooves formed in the surface of the valve parallel with its axis of rotation and spaced at substantially equal intervals around its perimeter. The axial seals straddle, and do not intersect, the apertures of the valving duct. Two of the four axial seals, preferably in diametrically opposed grooves, are longer than the other two by an amount equal to the axial width of one outer circumferential seal. All four axial seals act as keys in constraining the arcuate elements of the two inner circumferential seals to rotate in unison with the valve. Each of the two longer axial seals also acts as a key in constraining one outer circumferential seal to rotate in unison with the valve.

The periphery of the valve is irrigated with lubricating oil in planes transverse to the axis of rotation and so spaced axially that there must always be at least one outer and one inner circumferential seal between a plane of irrigation and the apertures of the valving duct. Means are provided in each plane of irrigation for free drainage of excess lubricating oil to the engine sump.

Whereas simple rotation of a cylindrical member in a cylindrical bore does little to spread lubricant axially, combined rotation and reciprocation is a known effective means of spreading lubricant uniformly over such conjugate surfaces. The effectiveness of combined rotation and reciprocation is greatest when the cyclical frequencies of rotation and reciprocations are not an integral ratio; for this reason, in the valve according to this invention, these two frequencies are related by a "creeping" ratio.

The valving duct is straddled by two pairs of relatively small pressure balancing ducts which are transverse to the valving duct and to the axis of rotation of the valve. Each balancing duct provides a path for communication of gas pressure from a sealed zone of the valve surface to another sealed zone of the surface on the remote side of the valve. The former sealed zone is separated from the latter by at least one inner circumferential seal and at least two axial seals. Each pair of balancing ducts has one pair of openings spaced axially a distance less than the axial spacing of the two inner circumferential seals while its other pair of openings is spaced axially a distance greater than the spacing of the inner circumferential seals but less than the spacing of the outer circumferential seals. Each of the two pairs of balancing ducts has its closely spaced openings on the same side of the valve as the widely spaced openings of the other pair.

Referring to the drawings:

FIG. 5 shows a partial section of 5—5 of FIGS. 1, 3 and 4;

FIG. 7 shows a section through 7—7 of FIGS. 5, 6 and 10;

Referring more particularly to the drawings wherein similar reference characters designate corresponding parts throughout:

Figure 1:
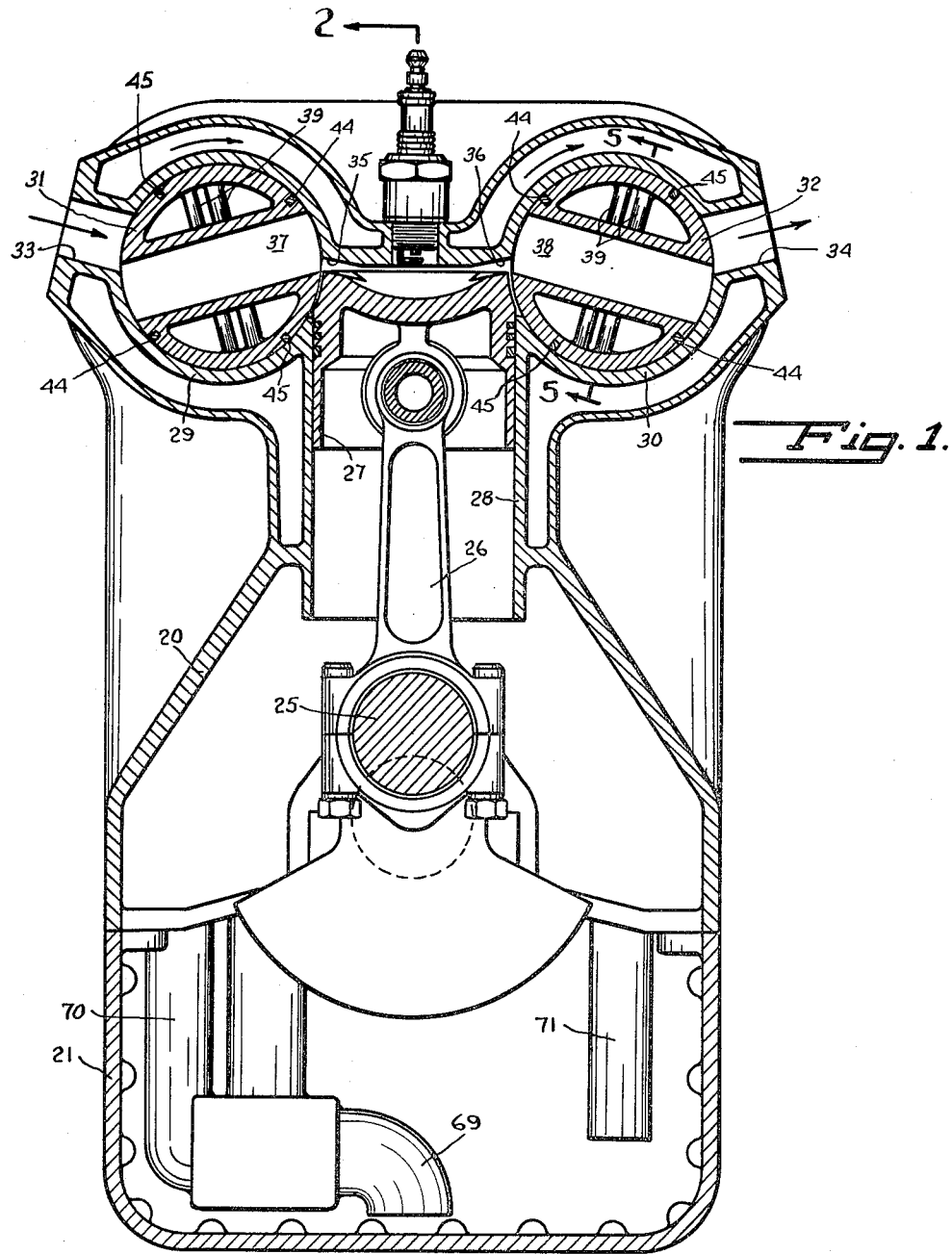
FIG. 1 shows a median transverse section through a single-cylinder engine with rotary intake and exhaust valves according to this invention. As shown, the moving parts are in positions corresponding with top dead centre of the exhaust stroke, indicated by 1—1 of FIG. 2.

Engine casing 20 is provided with sump 21, a front cover 22, and a rear cover 23 which also houses flywheel 24. Flywheel 24 is bolted to crankshaft 25 which is operably connected by connecting rod 26 to piston 27 which is reciprocable in cylinder 28. Cylinder 28 is provided with intake valve housing 29 and exhaust valve housing 30 in which intake rotary valve 31 and exhaust rotary valve 32 operate respectively. Intake valve housing 29 is provided with an intake port 33 and a cylinder port 35. Exhaust valve housing 30 is provided with an exhaust port 34 and a cylinder port 36. The axes of intake valve housing 29 and exhaust valve housing 30 are parallel with the axis of rotation of crankshaft 25.

Intake rotary valve 31 is provided with a tubular diametral valving duct 37 which cooperates with ports 33 and 35 of intake valve housing 29. Exhaust rotary valve 32 is provided with a tubular diametral valving duct 38 which cooperates with ports 34 and 36 of exhaust valve housing 30.

Since the construction of the rotary valve 31 is similar to that of rotary valve 32, the following detailed description of the construction will, for brevity, be referred to one of the valves only.

Figure 6:
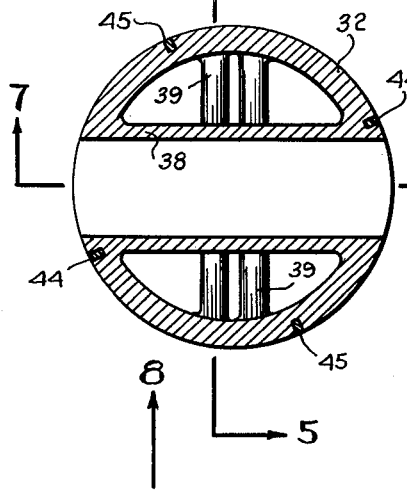
FIG. 6 shows a section through 6—6 of FIGS. 5, 7, 8 and 9.

Valving duct 38 of valve 32 (FIGS. 5, 6 and 7) is straddled by two symmetrical pairs of pressure balancing ducts 39. Each duct 39 terminates at the perimeter of valve 32 in apertures 40 and 41. Apertures 41 of each symmetrical pair of ducts 39 are axially spaced about twice as far apart on the surface of the valve 32 as apertures 40 of the same ducts on the remote side of valve 32. Apertures 41 of one pair of ducts 39 are on the same side of valve 32 as the apertures 40 of the other pair of ducts 39.

Valve 32 is provided with a lattice of seals comprising two circular seals 42, two circular seals 43, two straight seals 44 and two straight seals 45. Circular seals 42 and 43 are symmetrically disposed about valving duct 38 and are freely fitted in grooves formed in the periphery of valve 32 in planes normal to its axis of rotation. Each circular seal 42 comprises four arcuate elements. Each circular seal 43 is a gapped one-piece spring ring similar to a conventional piston ring. Circular seals 42 are located closely adjacent the apertures of valving duct 38 (FIG. 7). Circular seals 43 are spaced apart axially by twice the axial spacing of circular seals 42.

Figure 10:
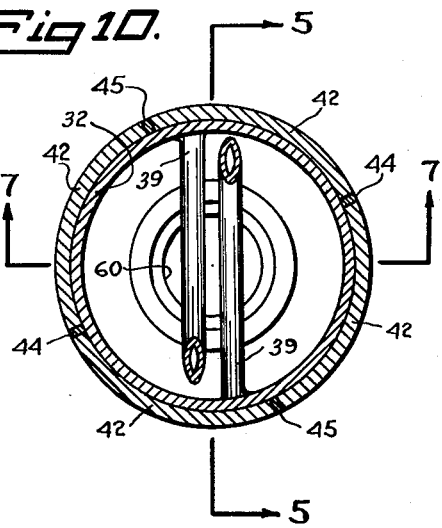
FIG. 10 shows a section through 10—10 of FIG. 5.
Figure 8:
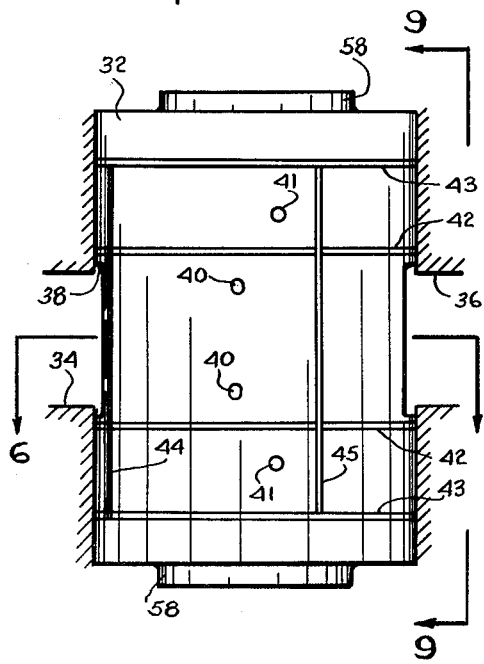
FIG. 8 shows an elevation of a rotary valve.

Straight seals 44 and 45 are freely fitted in grooves formed in the surface of valve 32 parallel with its axis of rotation and spaced around its perimeter at substantially uniform intervals. Straight seals 44 are diametrically opposed to each other and extend axially between opposed side faces of circular seals 43. Straight seals 45 are longer than seals 44 by an amount equal to the axial thickness of a circular seal 43. Each straight seal 45 acts as a key constraining a circular seal 43 to rotate in unison with valve 32 (FIG. 8). All straight seals 44 and 45 act as keys constraining the arcuate elements of circular seals 42 to turn in unison with valve 32. (FIG. 10).

Apertures 40 and 41 of balancing ducts 39 are so located (FIG. 8) in the lattice of seals that apertures 40 are between circular seals 42 and apertures 41 are in the zones between circular seals 42 and 43. Straight seals 44 and 45 are interposed between the apertures of balancing ducts 39 and the apertures of valving duct 38.

Valve 32 is provided with a driving gear 46 driven by idler 47 which is provided with an inclined flat-faced cam 48. Idler 47 is driven by pinion 49 which is coaxial with, and driven by, gear 50. Gear 50 is driven by crankshaft pinion 51. The overall speed ratio from crankshaft 25 to rotary valve 32 is 4:1. Idler 47 has a number of teeth different from the number of teeth on driving gear 46; this differential provides the desired creeping relationship of valve reciprocation to rotation.

Rocker 52 is provided at its lower end with a hemispherical socket 53 accommodating a freely fitting hemispherical pad 54 whose flat face engages the inclined flat face of cam 48. The upper end of rocker 52 is of tubular form terminating in a flat-faced annular pad 55 which engages the flat face of hemispherical pad 56 freely fitted in hemispherical socket 57 formed in boss 58 on the front end of valve 32.

Figure 2:
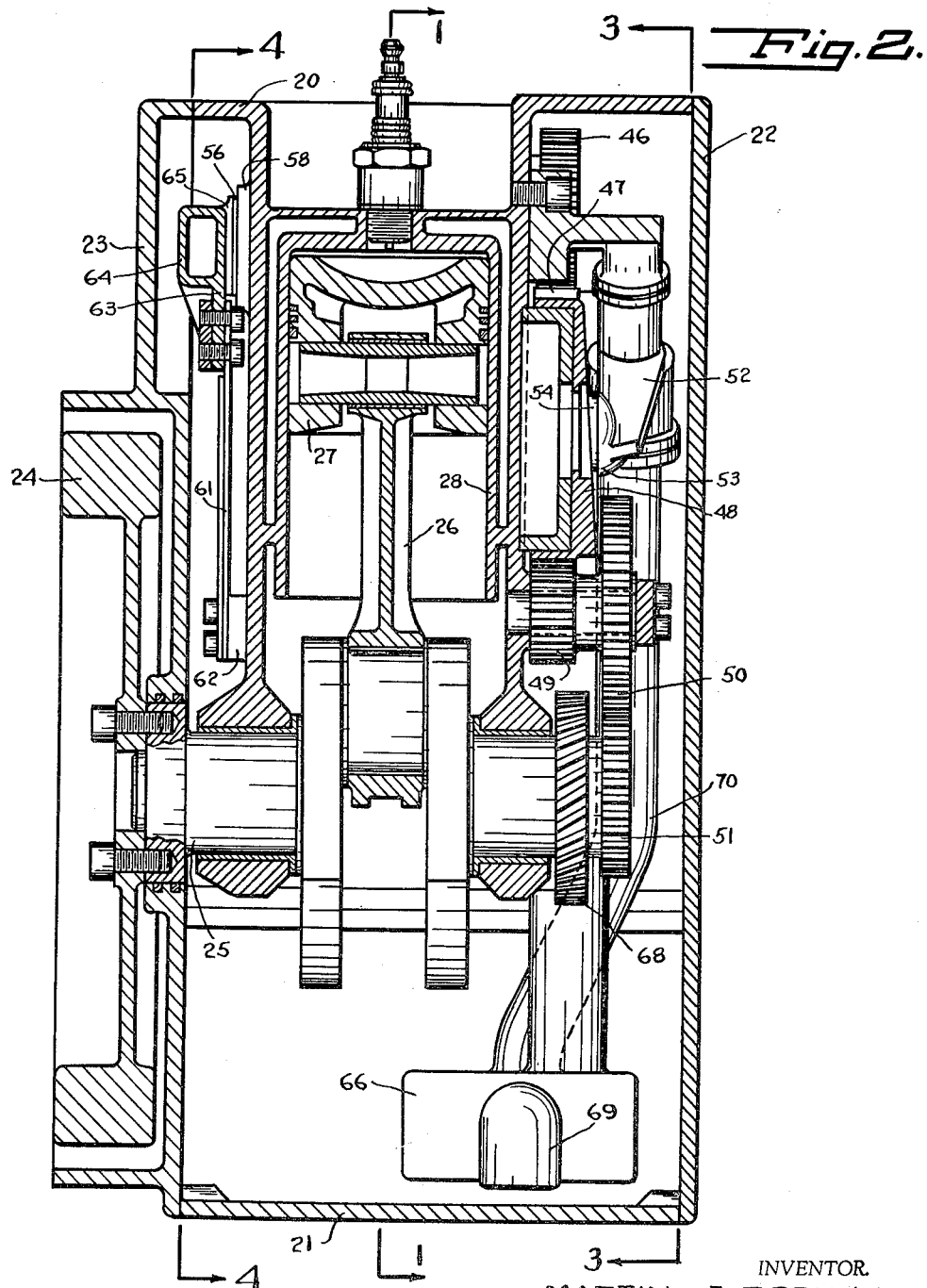
FIG. 2 shows a vertical section through the engine in the plane of the crankshaft axis, indicated by 2—2 of FIGS. 1, 3 and 4.
Figure 4:
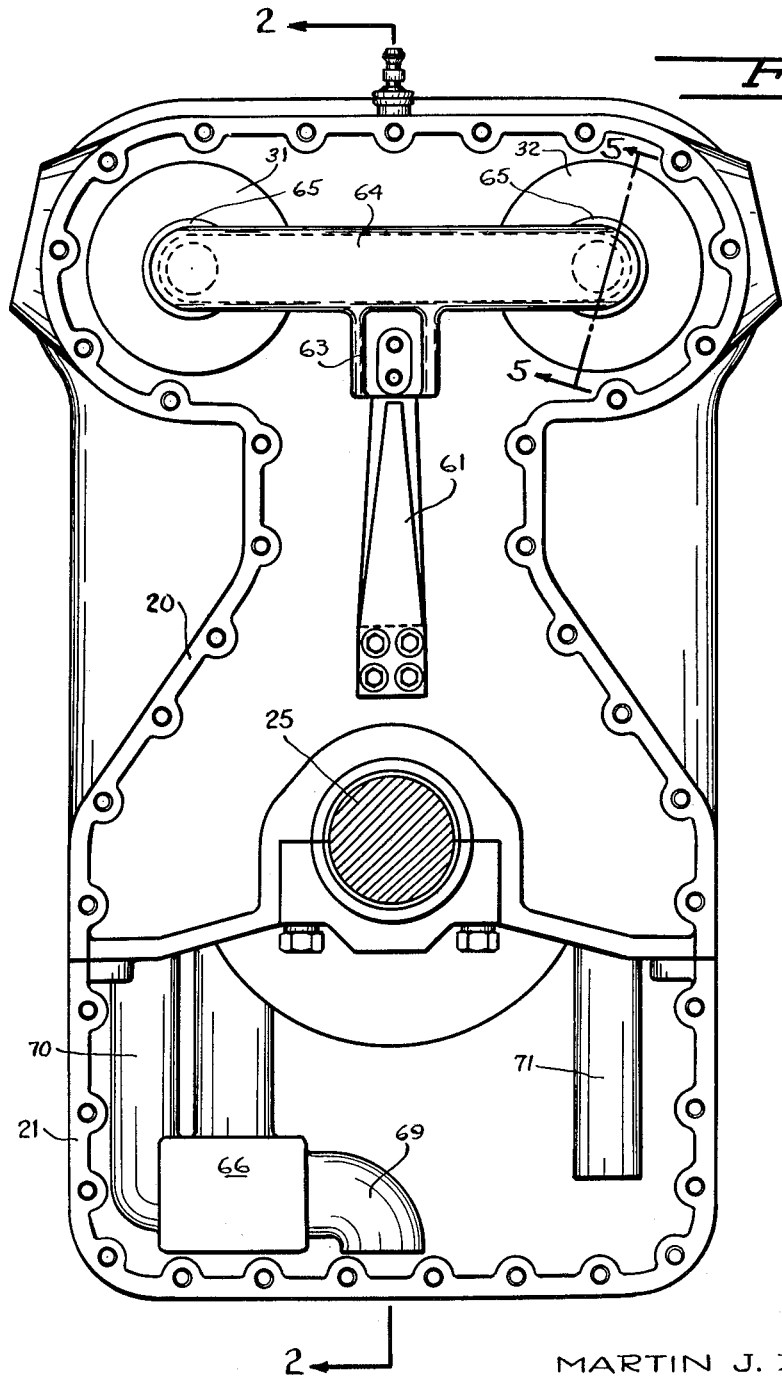
FIG. 4 shows section 4—4 of FIG. 2.

At the rear of the engine, the lower end of plate spring 61 (FIGS. 2 and 4) is bolted to boss 62 formed on engine casing 20. The upper end of plate spring 61 is bolted to lug 63 formed on tubular valve return rocker 64 which performs the dual function of urging valves 31 and 32 toward the front end of the engine and of conveying cooling oil from one valve to the other. Rocker 64 is provided at each end with a flat-faced annular pad 65 engaging hemispherical pads 56 freely fitted in hemispherical sockets 57 formed in bosses 58 at the rear ends of valves 31 and 32. Hemispherical pads 56 and bosses 58 are provided with bores 59 and 60 respectively for the passage of cooling oil. Whereas valves 31 and 32 are rotated in phased relationship to crankshaft 25 by means of the gear train described, they are reciprocated in unphased relationship to their rotation by face cam 48 through the medium of rockers 52.

The periphery of valve 32 is irrigated with lubricating oil close to circular seals 43, but only at the sides of seals 43 remote from seals 42. The compound rotary and reciprocating motion of valve 32 is effective in spreading a uniform film of lubricant over the inner surface of valve housing 30. The unphased relationship of reciprocation to rotation provides that a given point on the surface of valve 32 coincides with a given point on the surface of the bore of housing 30 only at intervals of several cycles of engine operation, whereby uniformity of surface temperature is maintained, thus minimizing thermal distortion and its consequences.

Figure 3:
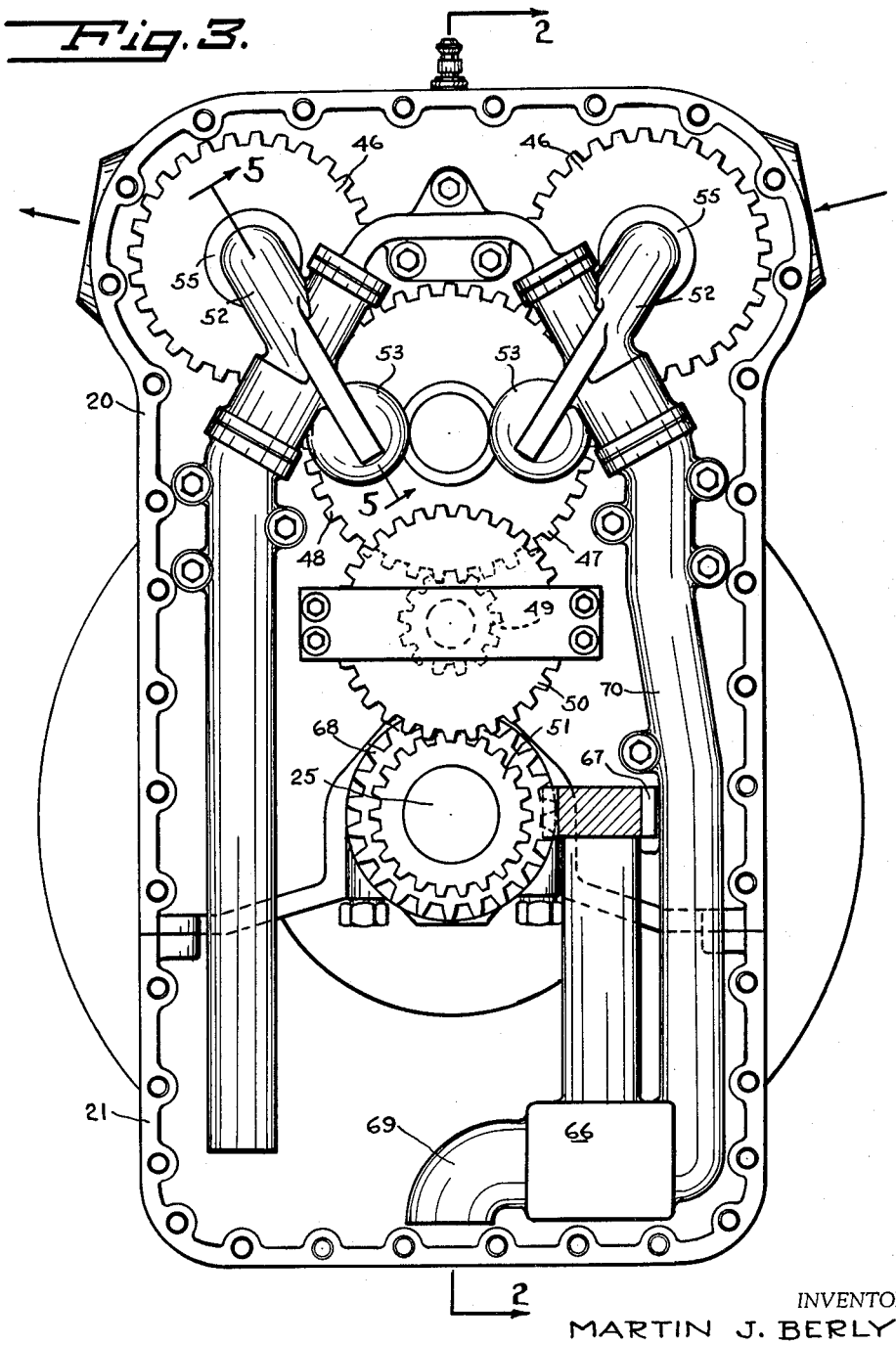
FIG. 3 shows section 3—3 of FIG. 2.

For internal cooling of valve 32, oil pump 66 driven by skew gear 67 (FIG. 3) meshing with crankshaft skew gear 68 draws oil from sump 21 by way of pump intake elbow 69 and delivers it by way of pipe 70 to the tubular rocker 52 which reciprocates intake rotary valve 31, cooling oil passes to the rear end of valve 31 and crosses the engine by way of tubular valve return rocker 64, then passes to the front end of exhaust rotary valve 32 and to sump 21 by way of exhaust valve tubular rocker 52 and discharge pipe 71.

Figure 9:
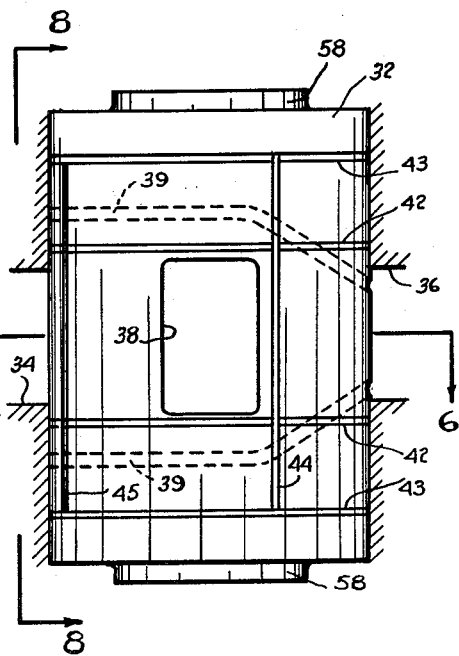
FIG. 9 shows an elevation of a rotary valve turned 90° from FIG. 8.

With reference to FIGS. 5, 8 and 9 it is to be noted that exhaust port 34 and cylinder port 36 are narrower, in the direction of the axis of rotation of valve 32, than valving duct 38 by at least the amplitude of reciprocation of valve 32; this provides that ports 34 and 36 are never lapped axially by valving duct 38.

FIGS. 8 and 9 show how the rectangular sealed zone on the surface of valve 32 which is subjected to gas pressure at cylinder port 36 is balanced by the same pressure, communicated via pressure balancing ducts 39 (shown dotted in FIG. 9), acting on two rectangular sealed zones of the same total area on the remote side of valve 32.

From the foregoing it will be seen that I have provided new and improved means for obtaining all of the objects and advantages of the invention.

I claim:

1. In a device of the character described, a housing having a valve bore with port means adapted to communicate therewith, a cylindrical rotary valve mounted in a free fit for continuous rotary motion in said valve bore, means for reciprocating said valve axially upon its rotation, a lattice of seals on the periphery of said rotary valve, said lattice of seals comprising at least four circumferential and four longitudinal sealing elements, said valve having a diametral valving duct and at least two pairs of pressure balancing ducts straddling said valving duct, each of said pairs of balancing ducts connecting diametrally opposed zones of equal area as defined by said lattice of seals, internal cooling means within said rotary valve, and means for applying lubricant to the periphery of said rotary valve outside the perimeter of said lattice.

2. In a device of the character described, a housing having a valve bore with port means adapted to communicate therewith, a cylindrical rotary valve mounted in a free fit for continuous rotary motion in said valve bore, means for reciprocating said valve axially upon its rotation, the frequency of said reciprocation being in creeping ratio relationship with the frequency of said rotation, a lattice of seals on the periphery of said rotary valve, said lattice of seals comprising at least four circumferential and four longitudinal sealing elements, said valve having a diametral valving duct and at least two pairs of pressure balancing ducts straddling said valving duct, each of said pairs of balancing ducts connecting diametrally opposed zones of equal area as defined by said lattice of seals, internal cooling means within said rotary valve, and means for applying lubricant to the periphery of said rotary valve outside the perimeter of said lattice.

3. In a device of the character described, a housing having a valve bore with port means adapted to communicate therewith, a cylindrical rotary valve mounted in a free fit for continuous rotary motion in said valve bore, means for reciprocating said valve axially upon its rotation, a lattice of seals on the periphery of said rotary valve, said lattice of seals comprising at least four circumferential and four longitudinal sealing elements, said valve having a diametral valving duct and at least two pairs of pressure balancing ducts straddling said valving duct, each of said pairs of balancing ducts connecting diametrally opposed zones of equal area as defined by said lattice of seals, fluid internal cooling means within said rotary valve, and means for applying lubricant to the periphery of said rotary valve outside the perimeter of said lattice, said means for imparting reciprocation to said valve incorporating means for delivering and carrying away said valve cooling fluid.

4. In a device of the character described, a housing having a valve bore with port means adapted to communicate therewith, a cylindrical rotary valve mounted in a free fit for continuous rotary motion in said valve bore, means for reciprocating said valve axially upon its rotation, the frequency of said reciprocation being in creeping ratio relationship with the frequency of said rotation, a lattice of seals on the periphery of said rotary valve, said lattice of seals comprising at least four circumferential and four longitudinal sealing elements, said valve having a diametral valving duct and at least two pairs of pressure balancing ducts straddling said valving duct, each of said pairs of balancing ducts connecting diametrally opposed zones of equal area as defined by said lattice of seals, fluid internal cooling means within said rotary valve, and means for applying lubricant to the periphery of said rotary valve outside the perimeter of said lattice, said means for imparting reciprocation to said valve incorporating means for delivering and carrying away said valve cooling fluid.

5. In a device of the character described, a housing having a valve bore with oppositely disposed port means adapted to communicate therewith, a cylindrical rotary valve mounted in a free fit for continuous rotary motion in said valve bore, means for reciprocating said valve axially upon its rotation, a lattice of seals on the periphery of said rotary valve, said lattice of seals comprising at least four circumferential and four longitudinal sealing elements, said valve having a diametral valving duct cooperating with said port means and at least two pairs of pressure balancing ducts straddling said valving duct, each of said pairs of balancing ducts connecting diametrally opposed zones of equal area as defined by said lattice of seals, internal cooling means within said rotary valve, and means for applying lubricant to the periphery of said rotary valve outside the perimeter of said lattice.

6. In a device of the character described, a housing having a valve bore with port means adapted to communicate therewith, a cylindrical rotary valve mounted in a free fit for continuous rotary motion in said valve bore, means for reciprocating said valve axially upon its rotation, a lattice of seals on the periphery of said rotary valve, said lattice of seals comprising at least four circular and four straight sealing elements, said valve having a diametral valving duct and at least two pairs of pressure balancing ducts straddling said valving duct, each of said pairs of balancing ducts connecting diametrally opposed zones of equal area as defined by said lattice of seals, internal cooling means within said rotary valve, and means for applying lubricant to the periphery of said rotary valve outside the perimeter of said lattice.

7. In a device of the character described, a housing having an intake valve bore and an exhaust valve bore with port means adapted to communicate with each of said bores, a cylindrical rotary valve in each of said bores, each of said valves being mounted in a free fit for continuous rotary motion in said valve bore, means for reciprocating said valves axially upon their rotation, a lattice of seals on the periphery of said rotary valves, said lattice of seals comprising at least four circumferential and four longitudinal sealing elements, said valves having a diametral valving duct and at least two pairs of pressure balancing ducts straddling said valving duct, each of said pairs of balancing ducts connecting diametrally opposed zones of equal area as defined by said lattice of seals, internal cooling means within said rotary valves, and means for applying lubricant to the periphery of said rotary valves outside the perimeter of said lattice.

8. In a device of the character described, a housing having an intake valve bore and an exhaust valve bore with port means adapted to communicate with each of said bores, a cylindrical rotary valve in each of said bores, each of said valves being mounted in a free fit for continuous rotary motion in said valve bore, means for reciprocating said valves axially upon their rotation, the frequency of said reciprocation being in creeping ratio relationship with the frequency of said rotation, a lattice of seals on the periphery of said rotary valves, said lattice of seals comprising at least four circumferential and four longitudinal sealing elements, said valves having a diametral valving duct and at least two pairs of pressure balancing ducts straddling said valving duct, each of said pairs of balancing ducts connecting diametrally opposed zones of equal area as defined by said lattice of seals, internal cooling means within said rotary valves, and means for applying lubricant to the periphery of said rotary valves outside the perimeter of said lattice.

9. In a device of the character described, a housing having an intake valve bore and an exhaust valve bore with port means adapted to communicate with each of said bores, a cylindrical rotary valve in each of said bores, each of said valves being mounted in a free fit for continuous rotary motion in said valve bore, means for reciprocating said valves axially upon their rotation, a lattice of seals on the periphery of said rotary valves, said lattice of seals comprising at least four circumferential and four longitudinal sealing elements, said valves having a diametral valving duct and at least two pairs of pressure balancing ducts straddling said valving duct, each of said pairs of balancing ducts connecting diametrally opposed zones of equal area as defined by said lattice of seals, fluid internal cooling means within said rotary valves, and means for applying lubricant to the periphery of said rotary valves outside the perimeter of said lattice, said means for imparting reciprocation to said valves incorporating means for delivering and carrying away said valve cooling fluid.

10. In a device of the character described, a housing having an intake valve bore and an exhaust valve bore with port means adapted to communicate with each of said bores, a cylindrical rotary valve in each of said bores, each of said valves being mounted in a free fit for continuous rotary motion in said valve bore, means for reciprocating said valves axially upon their rotation, the frequency of said reciprocation being in creeping ratio relationship with the frequency of said rotation, a lattice of seals on the periphery of said rotary valves, said lattice of seals comprising at least four circumferential and four longitudinal sealing elements, said valves having a diametral valving duct and at least two pairs of pressure balancing ducts straddling said valving duct, each of said pairs of balancing ducts connecting diametrally opposed zones of equal area as defined by said lattice of seals, fluid internal cooling means within said rotary valves, and means for applying lubricant to the periphery of said rotary valves outside the perimeter of said lattice, said means for imparting reciprocation to said valves incorporating means for delivering and carrying away said valve cooling fluid.

11. In a device of the character described, a housing having an intake valve bore and an exhaust valve bore with port means adapted to communicate with each of said bores, a cylindrical rotary valve in each of said bores, each of said valves being mounted in a free fit for continuous rotary motion in said valve bore, means for reciprocating said valves axially upon their rotation, a lattice of seals on the periphery of said rotary valves, said lattice of seals comprising at least four circular and four straight sealing elements, said valves having a diametral valving duct and at least two pairs of pressure balancing ducts straddling said valving duct, each of said pairs of balancing ducts connecting diametrally opposed zones of equal area as defined by said lattice of seals, internal cooling means within said rotary valves, and means for applying lubricant to the periphery of said rotary valves outside the perimeter of said lattice.

References Cited by the Examiner

UNITED STATES PATENTS

| | | | |
|---|---|---|---|
| 1,224,557 | 5/17 | McKelvy | 123—190 |
| 1,495,377 | 5/24 | Blood | 123—190 |
| 1,657,841 | 1/28 | Peris | 251—283 |
| 2,099,443 | 11/37 | Kraft | 137—330 XR |
| 2,229,933 | 1/41 | Parker | 251—283 XR |

FOREIGN PATENTS

| | | |
|---|---|---|
| 30,571 | 1907 | Austria. |
| 1,175,949 | 11/58 | France. |
| 1,202,564 | 7/59 | France. |

WILLIAM F. O'DEA, *Primary Examiner.*